US012723883B2

(12) United States Patent
Choi et al.

(10) Patent No.: US 12,723,883 B2
(45) Date of Patent: Sep. 1, 2026

(54) ROUTE AND HAZARD GUIDANCE FOR AUTONOMOUS VEHICLE THROUGH VECTOR-BASED DYNAMIC MAP

(71) Applicant: VESTELLALAB INC., Gyeonggi-do (KR)

(72) Inventors: Yung Ji Choi, Gyeonggi-do (KR); Eunjung Lee, Gyeonggi-do (KR); Sangsu Jung, Gyeonggi-do (KR); Dhananjay Singh, Gyeonggi-do (KR)

(73) Assignee: VESTELLALAB INC., Gyeonggi-do (KR)

( * ) Notice: Subject to any disclaimer, the term of this patent is extended or adjusted under 35 U.S.C. 154(b) by 22 days.

(21) Appl. No.: 18/842,401

(22) PCT Filed: Apr. 14, 2023

(86) PCT No.: PCT/KR2023/005084

§ 371 (c)(1),
(2) Date: Aug. 29, 2024

(87) PCT Pub. No.: WO2023/200293

PCT Pub. Date: Oct. 19, 2023

(65) Prior Publication Data

US 2025/0180367 A1 Jun. 5, 2025

(30) Foreign Application Priority Data

Apr. 14, 2022 (KR) ........................ 10-2022-0046408

(51) Int. Cl.
*G01C 21/34* (2006.01)
*B60W 60/00* (2020.01)
*G01C 21/00* (2006.01)

(52) U.S. Cl.
CPC ....... *G01C 21/3446* (2013.01); *B60W 60/001* (2020.02); *G01C 21/3415* (2013.01);
(Continued)

(58) Field of Classification Search
CPC ............ G01C 21/3446; G01C 21/3415; G01C 21/3461; G01C 21/3804; G01C 21/3885;
(Continued)

(56) References Cited

U.S. PATENT DOCUMENTS

2020/0182633 A1 6/2020 Liu
2021/0051446 A1 * 2/2021 Yorozuya ............... G08G 1/205
(Continued)

FOREIGN PATENT DOCUMENTS

JP 2019182401 10/2019
KR 1020080110593 12/2008
(Continued)

OTHER PUBLICATIONS

"Office Action of Korea Counterpart Application" with English translation thereof, issued on Jul. 16, 2024, p. 1-p. 14.

*Primary Examiner* — Anne Marie Antonucci
*Assistant Examiner* — Patrick Daniel Mohl
(74) *Attorney, Agent, or Firm* — JCIPRNET

(57) ABSTRACT

An apparatus and a method for guiding an autonomous vehicle to a destination using a vector-based dynamic map are provided. The apparatus includes a communication unit, a processor, and a memory storing instructions. The processor identifies static information and dynamic information on a travel route of the autonomous vehicle. Based on the static information and the dynamic information, the processor calculates an optimal route to the destination. The processor then guides the autonomous vehicle to the destination using information about the optimal route. A vector-based map is created, and direction vectors are calculated to determine the behavior of the autonomous vehicle at target nodes along the travel route.

12 Claims, 9 Drawing Sheets

(52) U.S. Cl.
CPC ..... *G01C 21/3461* (2013.01); *G01C 21/3804* (2020.08); *G01C 21/3885* (2020.08); *B60W 2554/20* (2020.02); *B60W 2554/40* (2020.02); *B60W 2556/40* (2020.02); *B60W 2556/45* (2020.02)

(58) Field of Classification Search
CPC .............. G01C 21/3679; G01C 21/383; G01C 21/3863; B60W 60/001; B60W 2554/20; B60W 2554/40; B60W 2556/40; B60W 2556/45; G06Q 50/40
See application file for complete search history.

(56) References Cited

U.S. PATENT DOCUMENTS

| | | | | |
|---|---|---|---|---|
| 2021/0409379 | A1* | 12/2021 | Hwang | G08G 1/0112 |
| 2022/0242440 | A1* | 8/2022 | Kurtz | G01C 21/3815 |
| 2022/0357169 | A1* | 11/2022 | Stegmann | G01C 21/3461 |
| 2023/0105871 | A1* | 4/2023 | Nichols | G06F 16/9027<br>701/25 |
| 2023/0106268 | A1* | 4/2023 | Venkatesh | H04L 63/105<br>701/23 |
| 2023/0280180 | A1* | 9/2023 | Kothari | B60W 60/001<br>701/450 |
| 2024/0367648 | A1* | 11/2024 | Ezoe | G05D 1/622 |

FOREIGN PATENT DOCUMENTS

| | | |
|---|---|---|
| KR | 1020200134137 | 1/2020 |
| KR | 1020200134138 | 1/2020 |
| KR | 1020200072576 | 6/2020 |
| KR | 1020200109595 | 9/2020 |

* cited by examiner

| STATIC INFORMATION |
| --- |
| PARKING SURFACE FEATURE INFORMATION (PARKING SURFACES FOR HANDICAPPED, WOMEN ONLY, COMPACT VEHICLES, ELECTRIC VEHICLES, SHARED VEHICLES, ETC.) |
| DIRECTIVE DISTANCE TO NODE (DIRECTION VECTOR) |
| LANE THICKNESS |
| TOTAL NUMBER OF NODES, NUMBER OF CONNECTED/BRANCHED PATHS AND FEATURE |
| ONE-WAY TRAFFIC INFORMATION |
| LIMITED SPEED |

FIG. 8A

| DYNAMIC INFORMATION |
|---|
| PARKING SURFACE OCCUPANCY INFORMATION (NUMBER OF SURFACES REMAINING IN FLOOR, AVAILABLE STATE IN SURFACE UNIT) |
| DIRECTIVE DISTANCE TO NODE ON OPTIMAL ROUTE (DIRECTION VECTOR) |
| BEHAVIOR (Driving policy) |
| PEDESTRIAN POSITION INFORMATION (POSITION VECTOR) AND DIRECTIVE DISTANCE (DIRECTION VECTOR) |
| DANGER INFORMATION, CONSTRUCTION INFORMATION |
| ROAD NARROWING INFORMATION SUCH AS STOP/DOUBLE PARKING, ETC. |

FIG. 8B

ROUTE AND HAZARD GUIDANCE FOR AUTONOMOUS VEHICLE THROUGH VECTOR-BASED DYNAMIC MAP

CROSS-REFERENCE TO RELATED APPLICATION

This application is a 371 of international application of PCT application serial no. PCT/KR2023/005084, and filed on Apr. 14, 2023, which claims priority benefit of Korea (KR) Patent Application No. 10-2022-0046408, and filed on Apr. 14, 2022. The entirety of each of the above mentioned patent applications is hereby incorporated by reference herein and made a part of this specification.

TECHNICAL FIELD

Embodiments of the present disclosure relate to route guidance for autonomous vehicles using vector-based dynamic maps, and more particularly, to an apparatus and a method, for route and hazard guidance for autonomous vehicles using vector-based dynamic maps.

BACKGROUND ART

In order for an autonomous vehicle to reach its destination, route guidance information for the autonomous vehicle is required. The autonomous vehicle may safely travel autonomously to the destination based on route guidance information.

For route guidance for the autonomous vehicle, a navigation map and a detailed map are used. For example, the navigation map includes road, route guidance, destination information, etc., making it difficult to respond to dynamic situations, and route guidance based on the navigation map has the limitation of not being able to distinguish between stationary objects and moving objects. The detailed map includes cloud-based stationary obstacles and lane-level information, making it difficult to respond to dynamic situations, and route guidance using the detailed map has limitations due to the large amount of computation and large data size required.

In route guidance for autonomous vehicles, the importance of vector-based maps that enable dynamic information to be made lighter in weight is emerging to overcome limitations of navigation maps and detailed maps.

DISCLOSURE

Technical Problem

The present disclosure is provided to solve several problems including the foregoing problems and aims to provide an apparatus and a method, for guiding a route for an autonomous vehicle based on vectors. However, such a problem is just an example, and the scope of the present disclosure is not limited thereto.

Technical Solution

According to an aspect of the present disclosure, an apparatus for guiding an autonomous vehicle to a destination includes a communication unit configured to form network connection with an external device, a processor, and a memory storing instructions executable by the processor, in which the processor is further configured to, by executing the instructions, identify static information and dynamic information on a travel route of the autonomous vehicle, calculate an optimal route to the destination, based on the static information and the dynamic information, and guide the autonomous vehicle to the destination by using information about the optimal route.

The processor may be further configured to, by executing the instructions, create a vector-based map for a travel route of the autonomous vehicle by using the static information and the dynamic information, converted on a vector basis and calculate a direction vector of the autonomous vehicle to the destination by using the static information and the dynamic information, converted on a vector basis.

The processor may be further configured to, by executing the instructions, create a vector-based map for the travel route and surroundings of the autonomous vehicle by using the static information and the dynamic information, converted on a vector basis and calculate information about a route of the autonomous vehicle to the destination on a vector basis by using the static information and the dynamic information, converted on a vector basis.

The processor may be further configured to, by executing the instructions, calculate a plurality of target nodes corresponding to the optimal route among a plurality of basic nodes included in the vector-based map and calculate a plurality of direction vectors indicating a travel route of the autonomous vehicle for the plurality of target nodes.

The processor may be further configured to, by executing the instructions, update the plurality of direction vectors based on the static information and the dynamic information and decide a behavior of the autonomous vehicle for each of the plurality of target nodes, by using the plurality of direction vectors.

The static information may include preset fixed information for the travel route of the autonomous vehicle.

The dynamic information may include changeable information that changes in real time with respect to the travel route of the autonomous vehicle, and the dynamic information may be updated in predetermined units of time.

According to an aspect of the present disclosure, a method of guiding an autonomous vehicle to a destination includes identifying static information and dynamic information on a travel route of the autonomous vehicle, calculating an optimal route to the destination, based on the static information and the dynamic information, and guiding the autonomous vehicle to the destination by using information about the optimal route.

The calculating of the optimal route to the destination may include creating a vector-based map for a travel route of the autonomous vehicle by using the static information and the dynamic information, converted on a vector basis and calculating a direction vector of the autonomous vehicle to the destination by using the static information and the dynamic information, converted on a vector basis.

The calculating of the direction vector may include calculating a plurality of target nodes corresponding to the optimal route among a plurality of basic nodes included in the vector-based map and calculating a plurality of direction vectors indicating a travel route of the autonomous vehicle for the plurality of target nodes.

The guiding of the autonomous vehicle to the destination may include updating the plurality of direction vectors based on the static information and the dynamic information and deciding a behavior of the autonomous vehicle for each of the plurality of target nodes, by using the plurality of direction vectors.

The static information may include preset fixed information for the travel route of the autonomous vehicle.

The dynamic information may include changeable information that changes in real time with respect to the travel route of the autonomous vehicle, and the dynamic information may be updated in predetermined units of time.

According to another aspect of the present disclosure, a computer program is provided which is stored on a recording medium to execute the above-described method by using a computer.

Other aspects, features and advantages than described above will become apparent from the detailed description, claims, and drawings for carrying out the present disclosure below.

Advantageous Effects

According to an embodiment of the present disclosure as described above, an apparatus and a method for guiding a route for an autonomous vehicle using a vector-based dynamic map, which is capable of effectively guiding the autonomous vehicle to a destination, may be implemented. However, the scope of the present disclosure is not limited by these effects.

DESCRIPTION OF DRAWINGS

The present disclosure may be easily understood by a combination of the following detailed description and the accompanying drawings, and reference numerals may refer to structural elements.

FIGS. 8A and 8B illustrate static information and dynamic information used in a vector-based map, according to an embodiment of the present disclosure.

MODE FOR INVENTION

Figure 1:
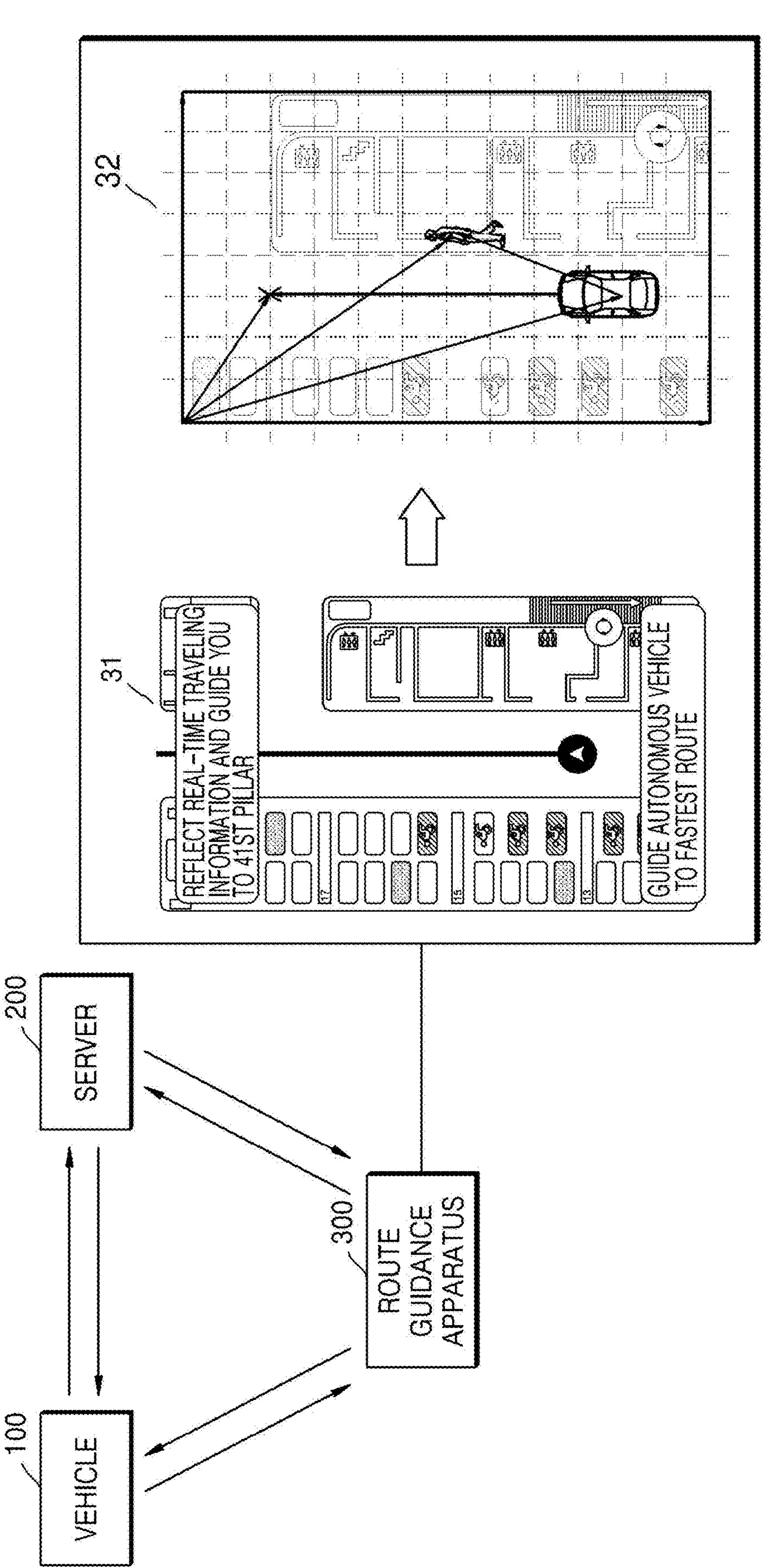
FIG. 1 illustrates an example for describing a process, performed by a route guidance apparatus, of guiding an autonomous vehicle to a destination by communicating with a server and the autonomous vehicle.

The present disclosure may have various modifications thereto and various embodiments, and thus particular embodiments will be illustrated in the drawings and described in detail in a detailed description. Effects and features of the present disclosure, and methods for achieving them will become clear with reference to the embodiments described later in detail together with the drawings. However, the present disclosure is not limited to the embodiments disclosed below and may be implemented in various forms.

Hereinafter, embodiments of the present disclosure will be described in detail with reference to the accompanying drawings, and in description with reference to the drawings, the same or corresponding components are given the same reference numerals, and redundant description thereto will be omitted.

In the following embodiments, the terms such as first, second, etc., have been used to distinguish one component from other components, rather than limiting. Singular forms include plural forms unless apparently indicated otherwise contextually. Herein, the terms “include”, “have”, or the like, are intended to mean that there are features, or components, described herein, but do not preclude the possibility of adding one or more other features or components.

In the drawings, the size of components may be exaggerated or reduced for convenience of description. For example, since the size and thickness of each component shown in the drawings are arbitrarily shown for convenience of description, the present disclosure is not necessarily limited to the illustrated bar.

In the following embodiments, when a portion, such as a region, a component, a portion or unit, a block, a module, etc., is present on or above another portion, this case may include not only a case where it is directly on the other portion, but also a case where another region, component, portion or unit, block, module, etc., is arranged between the portion and the other portion. When a region, a component, a portion or unit, a block, a module, etc., are connected, this case may include not only a case where a region, a component, a portion or unit, a block, and a module are directly connected, but also a case where they are connected indirectly by another region, component, portion or unit, block, and module arranged therebetween.

A “route guidance apparatus” may mean an apparatus used to guide an autonomous vehicle to a destination. In the route guidance apparatus, a guidance program used to guide the autonomous vehicle to the destination may be installed. For example, the route guidance apparatus may perform a route guidance operation to guide the autonomous vehicle to the destination, based on information transmitted and received through a server and the autonomous vehicle and information input from the guidance program. For example, the route guidance apparatus may be a user terminal of a user, e.g., a mobile terminal device such as a smartphone. Alternatively, the route guidance apparatus may be mounted on the autonomous vehicle. For example, the route guidance apparatus may be embedded in a processor of the autonomous vehicle.

The “autonomous vehicle” or the “vehicle” may mean a vehicle that autonomously travels to the destination according to guidance of the route guidance apparatus. In the autonomous vehicle, at least one sensor may be installed to collect surrounding information of the vehicle. For example, the autonomous vehicle may recognize an object, a person, a lane, etc., near the vehicle and exchange data with the server and the route guidance apparatus over a network. The autonomous vehicle may travel to the destination, based on the information transmitted and received through the server and the route guidance apparatus and the information input from the guidance program.

The “server” may mean a server device used to guide the autonomous vehicle to the destination. In the server, a program used to guide the autonomous vehicle to the destination may be installed. For example, in the server, information for creating a map on a travel route of the autonomous vehicle may be stored. The server may perform a route guidance operation to guide the autonomous vehicle to the destination, based on information transmitted and received through the route guidance apparatus and the autonomous vehicle and the information input from the guidance program.

FIG. 1 illustrates an example for describing a process, performed by a route guidance apparatus, of guiding an autonomous vehicle to a destination by communicating with a server and the autonomous vehicle.

Referring to FIG. 1, a route guidance apparatus 300 may be connected to a server 200 and a network. The route guidance apparatus 300 may also be connected to a vehicle 100 and the network. The vehicle 100 may also be connected to the server 200 and the network. While one route guidance apparatus, one server, and one vehicle are connected to the network in FIG. 1 as an example, a plurality of route guidance apparatuses, a plurality of servers, and/or a plurality of vehicles may be connected to the network.

The route guidance apparatus 300 may execute an application for guiding the vehicle 100 to a destination. The route guidance apparatus 300 may also display route guidance information for the vehicle 100 through the application. Specifically, the route guidance apparatus 300 may request the route guidance information from the server 200 through the application. The route guidance apparatus 300 may receive route guidance information from the server 200 and display the same through the application.

For example, as shown in an image 31 of FIG. 1, the route guidance apparatus 300 may display a user interface for guiding the vehicle 100 to the destination. The route guidance apparatus 300 may receive an input regarding the destination of the vehicle 100 through the user interface. The image 31 of FIG. 1 will be descried in detail with reference to FIG. 6.

The route guidance apparatus 300 may receive the route guidance information from the server 200. For example, the route guidance information may include information on the travel route of the vehicle 100. For example, the route guidance information may include static information and dynamic information on the travel route of the vehicle 100. For example, the static information may include fixed information preset for the travel route of the vehicle 100. The dynamic information may include changeable information changing in real time with respect to the travel route of the vehicle 100. The dynamic information may be updated in predetermined units of time.

In an embodiment of the present disclosure, the server 200 may receive the dynamic information on the travel route of the vehicle 100 from the vehicle 100. For example, the vehicle 100 may collect the dynamic information on the travel route of the vehicle 100 through various sensors, cameras, or radars included in the vehicle 100 and transmit the dynamic information on the travel route of the vehicle 100 to the server 200 and/or the route guidance apparatus 300. In this case, the server 200 may generate the route guidance information using the dynamic information on the travel route of the vehicle 100 and pre-stored static information, and transmit the generated route guidance information to the route guidance apparatus 300. The present disclosure is not limited thereto, and the route guidance information may be generated in the route guidance apparatus 300.

The route guidance apparatus 300 may display the route guidance information to guide the autonomous vehicle to the destination, based on the dynamic information on the travel route of the vehicle 100. For example, the dynamic information may include pedestrian appearance information. An image 32 of FIG. 1 will be descried in detail with reference to FIG. 7.

The route guidance apparatus 300 may identify the static information and the dynamic information on the travel route of the vehicle 100. The route guidance apparatus 300 may calculate an optimal route to the destination of the vehicle 100 based on the static information and the dynamic information. The route guidance apparatus 300 may guide the vehicle 100 to the destination by using information about the optimal route.

Figure 2:
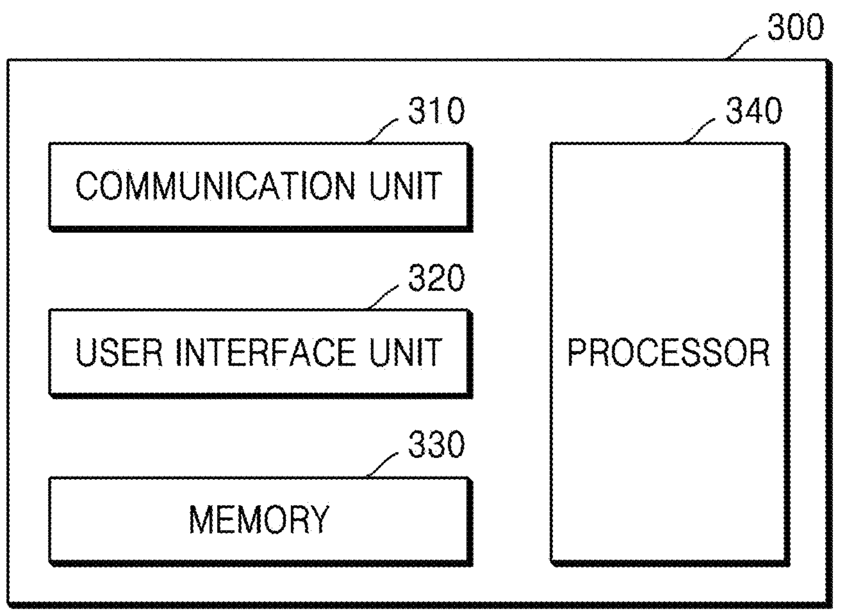
FIG. 2 is a block diagram schematically showing components of a route guidance apparatus, according to an embodiment of the present disclosure.

FIG. 2 is a block diagram schematically showing components of a route guidance apparatus, according to an embodiment of the present disclosure.

Referring to FIG. 2, the route guidance apparatus 300 may include a communication unit 310, a user interface unit 320, a memory 330, and a processor 340. Hereinafter, the aforementioned components will be described.

The communication unit 310 may include a communication module supporting one of various wired/wireless communication methods. For example, the communication module may be in the form of a chipset, or a sticker/barcode (e.g., a sticker including an NFC tag) including information required for communication. The communication module may be a short-range communication module or a wireless communication module.

For example, the communication unit 310 may support at least one of a wireless local area network (LAN), Wireless Fidelity (Wi-Fi), Wi-Fi Direct (WFD), Bluetooth, Bluetooth Low Energy (BLE), a wired LAN, near field communication (NFC), Zigbee infrared data association (IrDA), 3rd-Generation (3G), 4th-Generation (4G), and 5-th Generation (5G).

The user interface unit 320 may include an input unit for receiving an input for controlling an operation of the route guidance apparatus 300 from a user and an output unit for displaying information such as a result corresponding to the operation of the route guidance apparatus 300, a state of the route guidance apparatus 300, etc. For example, the user interface unit 320 may include a manipulation panel for receiving a user input, a display panel for displaying a screen, etc.

Specifically, the input unit may include devices capable of receiving various forms of user inputs, for example, a keyboard, a physical button, a touch screen, a camera, a microphone, etc. The output unit may include, for example, a display panel, a speaker, etc. However, without being limited thereto, the user interface unit 320 may include a device supporting various inputs and outputs.

The memory 330 may store software or a program. Hereinbelow, software or a program may indicate software or a program used by a device such as the vehicle 100, the server 200, the route guidance apparatus 300, etc. For example, the memory 330 may store instructions regarding an operating method of the route guidance apparatus 300 which executes an application for guiding an autonomous vehicle to a destination and displays route guidance information according to information of the route guidance apparatus 300 through the application.

The processor 340 may control an overall operation of the route guidance apparatus 300 and include at least one processor such as a central processing unit (CPU), etc. The processor 340 may include at least one processors specialized for each function or may be one integrated processor. For example, the processor 340 may include a registration module that performs an operation for registration. For example, the processor 340 may call at least one application programming interface (API) used to perform an operation for registration.

The processor 340 may execute a program stored in the memory 330, read data or a file stored in the memory 330, or store new data or file in the memory 330. The processor 340 may execute an application for guiding an autonomous vehicle to a destination by executing the instructions stored in the memory 330, and display route guidance information according to information of the route guidance apparatus 300.

The processor 340 may receive static information and dynamic information on the travel route of the autonomous vehicle, from the server 200 and/or the autonomous vehicle, through the communication unit 310. The processor 340 may calculate an optimal route to the destination of the autonomous vehicle based on the static information and the dynamic information. The processor 340 may also guide the autonomous vehicle to the destination by using information about the optimal route.

Figure 3:
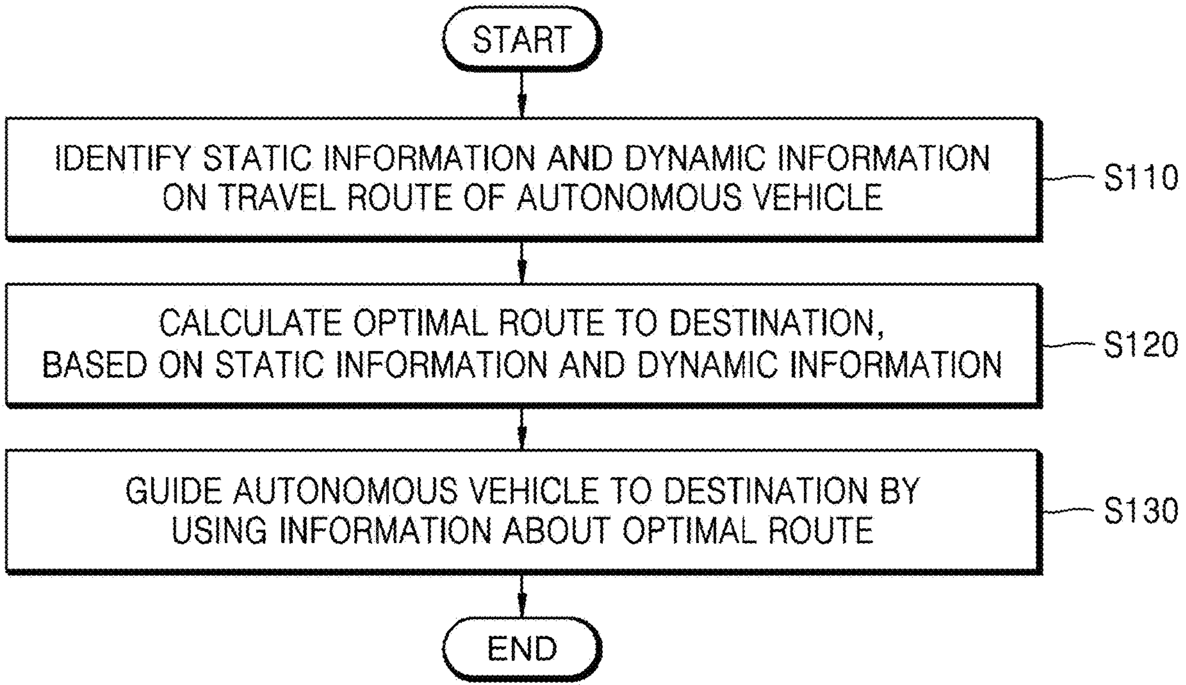
FIG. 3 is a flowchart of an example for describing a method, performed by a route guidance apparatus, of guiding a route for an autonomous vehicle.

FIG. 3 is a flowchart of an example for describing a method, performed by a route guidance apparatus, of guiding a route for an autonomous vehicle. However, the present disclosure is not limited thereto, and some operations of the route guidance apparatus 300 may also be performed in the server 200.

Referring to FIG. 3, in operation S110 of the route guidance apparatus 300, the route guidance apparatus 300 may identify static information and the dynamic information on the travel route of the autonomous vehicle. For example, the route guidance apparatus 300 may receive the static information and the dynamic information on the travel route of the autonomous vehicle from the server 200 and/or the autonomous vehicle 100.

In operation S120 of the route guidance apparatus 300, the route guidance apparatus 300 may calculate an optimal route to the destination of the autonomous vehicle based on the static information and the dynamic information. For example, the route guidance apparatus 300 may convert the static information and the dynamic information based on a vector. The route guidance apparatus 300 may also generate a vector-based map layer for the travel route of the autonomous vehicle, by using the static information and the dynamic information, converted on a vector basis. The route guidance apparatus 300 may calculate a direction vector to the destination from the autonomous vehicle, which is derived using the static information and the dynamic information, converted on a vector basis.

In an embodiment of the present disclosure, the route guidance apparatus 300 may calculate a plurality of target nodes corresponding to the optimal route, among a plurality of basic nodes included in the vector-based map. The route guidance apparatus 300 may also calculate a plurality of direction vectors indicating the travel route of the autonomous vehicle, with respect to the plurality of target nodes.

In operation S130 of the route guidance apparatus 300, the route guidance apparatus 300 may guide the autonomous vehicle to the destination by using the information about the optimal route.

In an embodiment of the present disclosure, the route guidance apparatus 300 may update the plurality of direction vectors based on the static information and the dynamic information. The route guidance apparatus 300 may decide a behavior of the autonomous vehicle for each of the plurality of target nodes by using the plurality of direction vectors.

Figure 4:
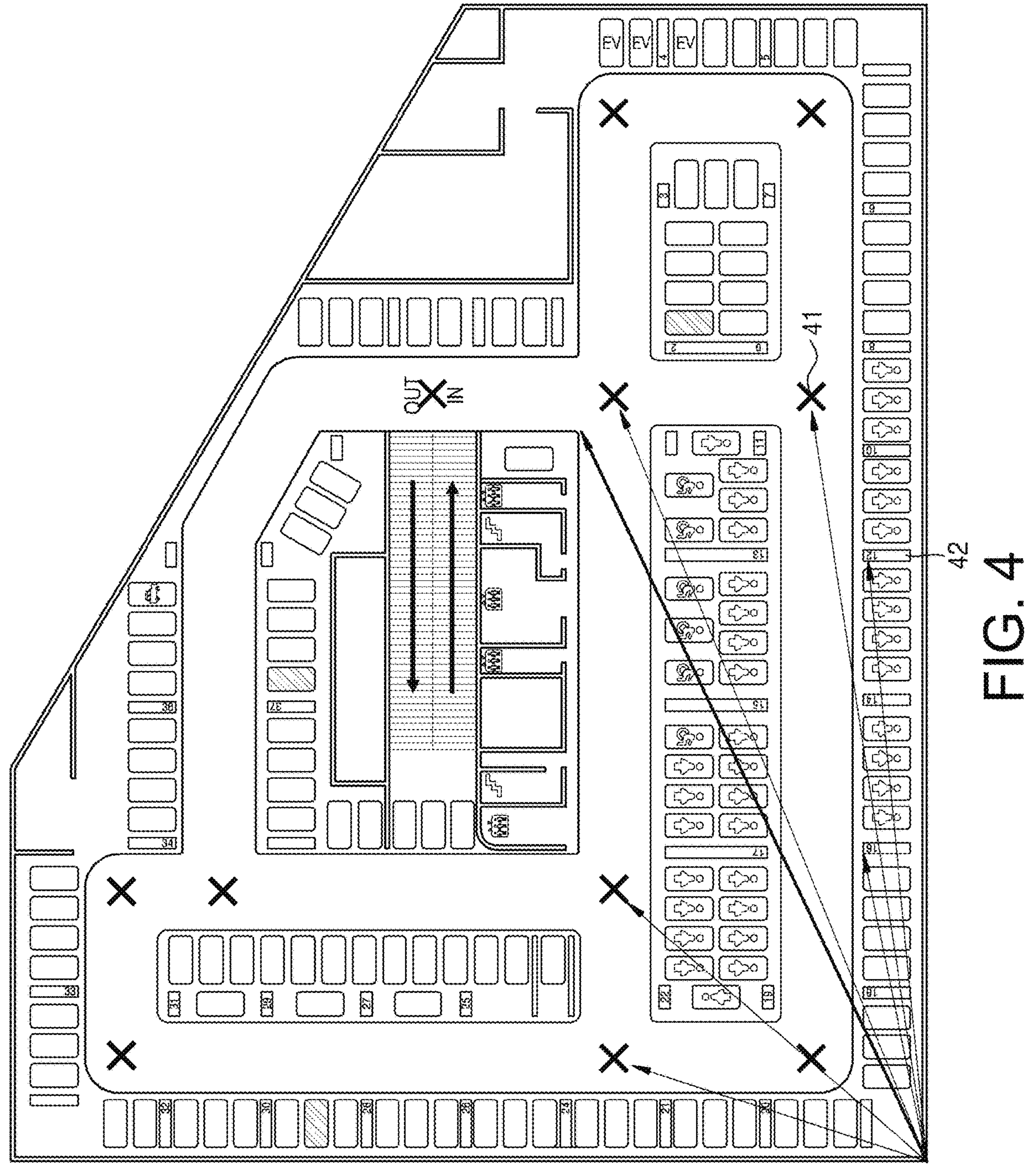
FIGS. 4 and 5 illustrate an example for describing a method, performed by a route guidance apparatus, of performing route guidance for an autonomous vehicle by using a vector-based map.
Figure 5:
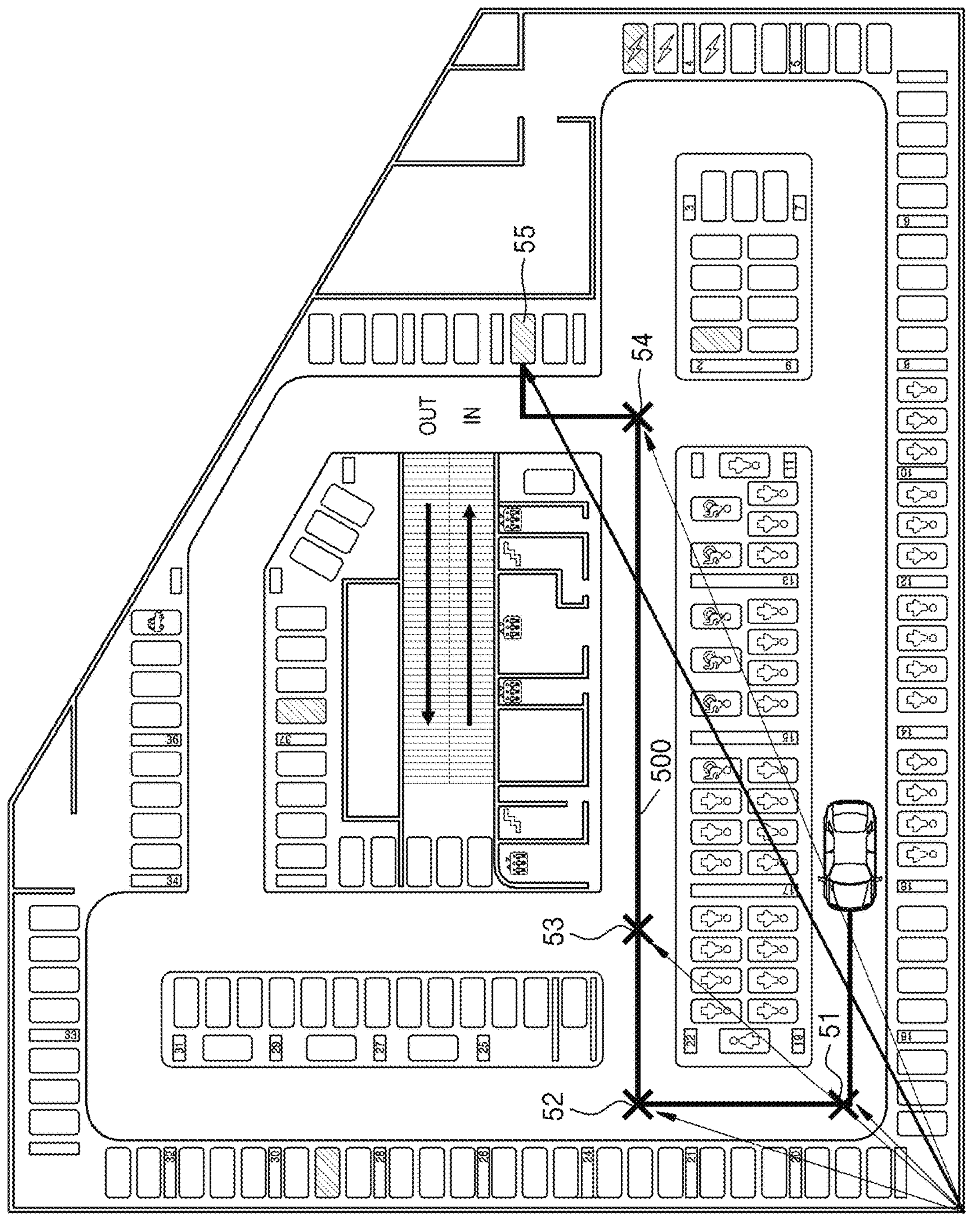
Figure 6:
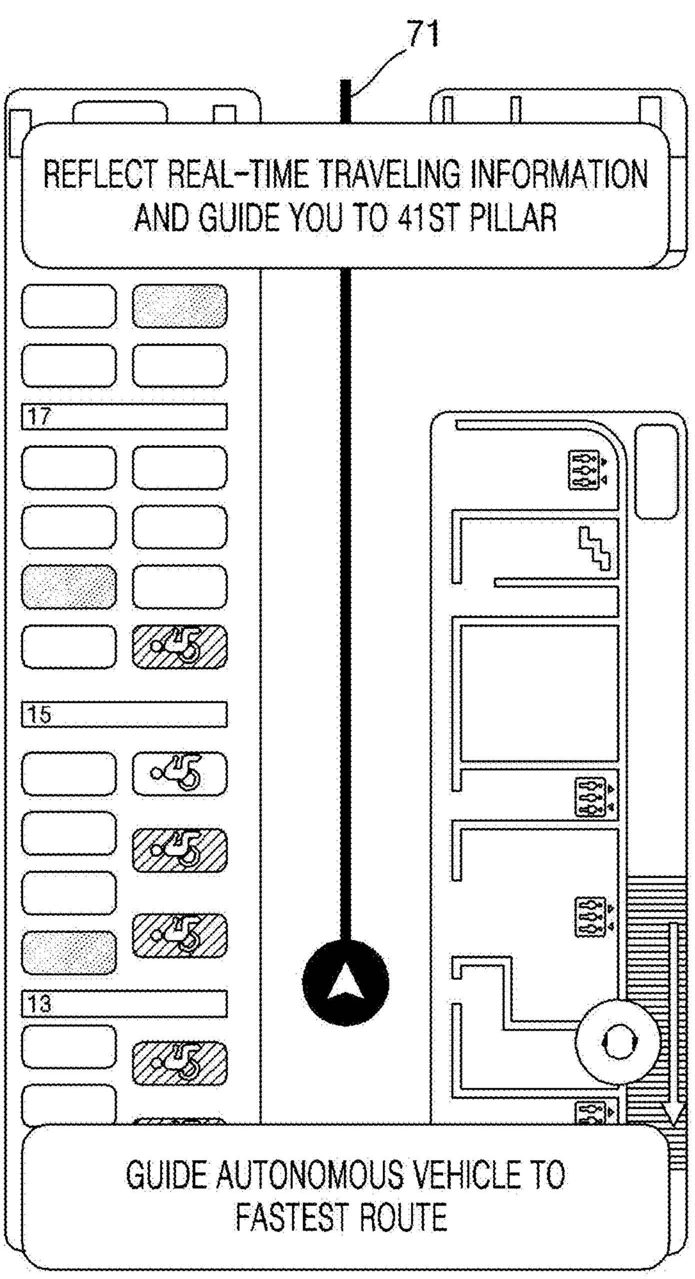
FIGS. 6 and 7 illustrate an example of a user interface displaying a route guidance screen by using a vector-based dynamic map in a route guidance apparatus.

FIGS. 4 to 6 illustrate an example for describing a method, performed by a route guidance apparatus, of performing route guidance for an autonomous vehicle by using a vector-based map.

The route guidance apparatus 300 may create a vector-based map. For example, the route guidance apparatus 300 may create the vector-based map based on information received from the server 200 and/or the vehicle 100. However, the present disclosure is not limited thereto, and the vector-based map may be created by the server 200.

The route guidance apparatus 300 may calculate an optimal route to a destination, based on static information and dynamic information. For example, as shown in FIG. 4, the route guidance apparatus 300 may create the vector-based map for a traveling space of the autonomous vehicle by using the static information converted on a vector basis. For example, referring to FIG. 4, when the autonomous vehicle sets a parking-available space as a destination in a parking lot and travels to the destination, the vector-based map may be created for the parking lot. For example, the vector-based map may include a basic node 41 and a space feature point 42. For example, the space feature point 42 may indicate a point on a map generated based on space feature information (e.g., a parking lot, a wall corner, a vehicle entrance, a pedestrian entrance, parking spaces for the handicapped, women only, compact vehicles, electric vehicles, and shared vehicles, parking surface features, etc.).

The vector-based map may indicate the basic node 41 and the space feature point 42 on a vector coordinate system. For example, as shown in FIG. 4, the basic node 41 and the space feature point 42 may be expressed with coordinates of a position vector having a size and a direction with respect to a pre-designated zero point.

The route guidance apparatus 300 may calculate a position vector for target nodes on a path to the destination of the autonomous vehicle and a direction vector with respect to a current traveling vehicle, by using the static information and the dynamic information, converted on a vector basis. For example, the route guidance apparatus 300 may calculate a plurality of target nodes corresponding to the optimal route, among a plurality of basic nodes included in the vector-based map. As shown in FIGS. 4 and 5, the plurality of target nodes may be set for the basic node on the travel route of the autonomous vehicle in the parking lot. Herein, the node may indicate a position at which the autonomous vehicle needs to decide or receive a behavior. For example, the behavior may indicate an operation of the autonomous vehicle, such as straight movement, left turn, right turn, etc. However, the position of the node may not be set only when the behavior is determined or received, and may be set at random or depending on convenience by map manufacturer and provider.

For example, as shown in FIG. 5, nodes 51, 52, 53, and 54 included on a travel route 500 on which the autonomous vehicle travels to a destination 55 may be set as target nodes.

The route guidance apparatus 300 may calculate the plurality of direction vectors for the autonomous vehicle with respect to the plurality of target nodes. For example, as shown in FIG. 5, a first direction vector from the current position of the autonomous vehicle to a first target node 51 may be calculated. Second, third, fourth, and fifth direction vectors from the current position of the autonomous vehicle to a second target node 52, a third target node 53, a fourth target node 54, and the destination may be calculated, respectively. For example, the second direction vector may be a vector having a size and a direction from the current position of the autonomous vehicle as a start point to the second target node 52 as an end point. When required for autonomous vehicle's decision, the direction vector between target node vectors may be calculated. For example, the calculated direction vector may be a vector having a size and a direction from the first target node 51 as a start point to the second target node 52 as an end point.

The route guidance apparatus 300 may guide the autonomous vehicle to the destination by using information about the optimal route. For example, as shown in FIG. 5, the route guidance apparatus 300 may guide the autonomous vehicle to the destination 55 by using information about the plurality of target nodes 51, 52, 53, and 54 on the optimal route 500.

The route guidance apparatus 300 may update the plurality of direction vectors based on the static information and the dynamic information. For example, the route guidance apparatus 300 may update the static information and the dynamic information in predetermined units of time and re-generate a plurality of direction vectors based on the updated static information and dynamic information.

The route guidance apparatus 300 may decide the behavior of the autonomous vehicle for each of the plurality of target nodes by using the plurality of direction vectors. For example, referring to FIGS. 5 and 6, the route guidance apparatus 300 may decide the behavior of the autonomous vehicle based on the plurality of direction vectors for the plurality of target nodes 51, 52, 53, and 54. For example, in an embodiment of FIG. 5, in the first target node 51, the behavior of the autonomous vehicle may be decided as right turn. In the second target node 52, the behavior of the autonomous vehicle may be decided as right turn. In the third target node 53, the behavior of the autonomous vehicle may be decided as straight movement. In the fourth target node 54, the behavior of the autonomous vehicle may be decided as left turn. For example, the route guidance apparatus 300 may compare the first direction vector and the second direction vector using an inter-vector inner product operation, etc., and decide the behavior of the autonomous vehicle as right turn, in the first target node 51.

Figure 7:
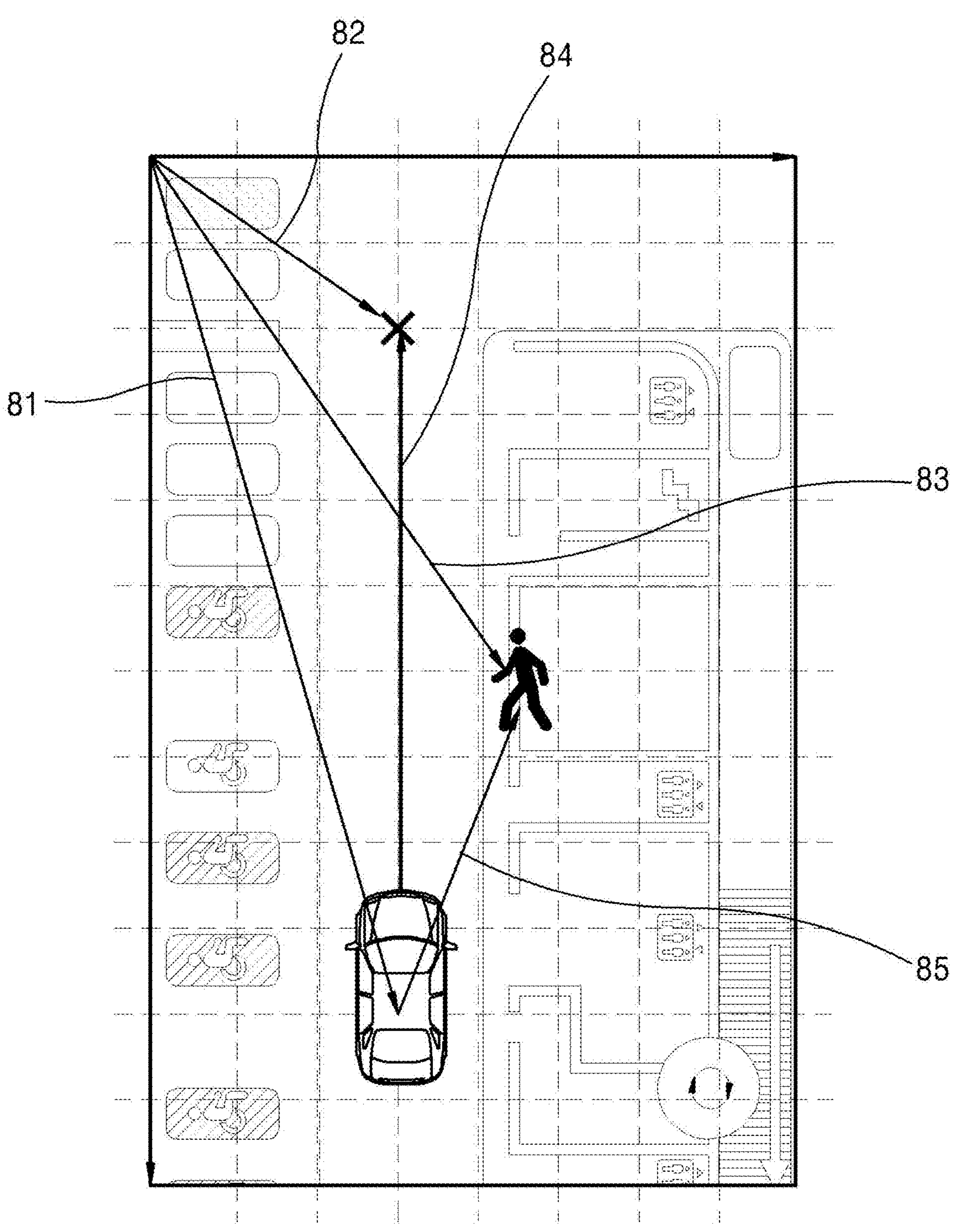

FIGS. 6 and 7 illustrate an example of a user interface displaying a route guidance screen by using a vector-based map in a route guidance apparatus.

First, referring to FIG. 6, the route guidance apparatus 300 may display a user interface for guiding the autonomous vehicle to the destination. The route guidance apparatus 300 may receive an input for the destination of the autonomous vehicle and guide the autonomous vehicle to the destination, through the user interface. For example, as shown in FIG. 6, the route guidance apparatus 300 may identify the static information and the dynamic information on the travel route of the autonomous vehicle, calculate the optimal route to the destination, based on the static information and the dynamic information, and guide the autonomous vehicle to the destination by using the information about the optimal route. For example, the route guidance apparatus 300 may display a message 71 to display route guidance information, through the user interface. The route guidance information may be provided as a log such as json, array form, etc., immediately available in an operating system of the autonomous vehicle.

Referring to FIGS. 6 and 7 together, the route guidance apparatus 300 may identify the static information. For example, the static information may include information about a node. Herein, the node may be preset in a place such as a corner of a parking lot, etc., where an operation of a vehicle is required. For example, information about a lane, a node, a road width, etc., of the parking lot may be previously stored in the server in the form of an application programming interface (API).

The route guidance apparatus 300 may identify the dynamic information. For example, the dynamic information may include a position of a pedestrian. Herein, the position of the pedestrian may be obtained through artificial intelligence (AI) homography algorithms with respect to an image obtained by a sensor included in the autonomous vehicle, etc. The dynamic information may also include the current position information of the autonomous vehicle. For example, the current position information of the autonomous vehicle may be obtained by a position determination method using a global positioning system (GPS) or a positioning sensor included in the autonomous vehicle.

In the embodiment of FIG. 7, a direction vector 84 of the autonomous vehicle may be calculated through a vector operation between a direction vector 81 of the vehicle and a direction vector 82 of a target node. Herein, the direction vector may indicate a vector having a direction and a size connecting a start point to an end point. For example, a vector coordinate system according to an embodiment of the present disclosure may be converted into a standard coordinate system. For example, as shown in Equation 1, by using a pixel on the vector coordinate system, a conversion rate (scale), etc., the vector coordinate system may be converted into the standard coordinate system.

Number of Pixels $N$ (pixel)*Conversion Rate $r$ (cm/pixel)=Distance $d$ (cm) <Equation 1>

The route guidance apparatus 300 may re-generate the direction vector by using the dynamic information. Alternatively, the route guidance apparatus 300 may decide the behavior of the autonomous vehicle by using the dynamic information. For example, the dynamic information may include a pedestrian, a hazard, an unexpected situation, etc.

For example, as shown in FIG. 7, when the pedestrian appears on the travel route of the autonomous vehicle, a direction vector 85 of the pedestrian with the autonomous vehicle as a start point may be calculated. In this case, the route guidance apparatus 300 may decide the behavior of the autonomous vehicle based on the direction vector 85 of the pedestrian. For example, the route guidance apparatus 300 may decide the behavior of the autonomous vehicle such that the autonomous vehicle may travel slowly by slowing down when the size of the direction vector 85 of the pedestrian falls within a predetermined direction range and is less than or equal to a first threshold value. The route guidance apparatus 300 may decide the behavior of the autonomous vehicle to stop the vehicle when the size of the direction vector 85 of the pedestrian is less than or equal to a predetermined second threshold value.

The route guidance apparatus 300 may calculate the direction vector 84 for the autonomous vehicle through a vector operation among the position vector 81 of the pedestrian, the position vector 82 of the target node, and the position vector 83 of the pedestrian. For example, the route guidance apparatus 300 may add, to an obstacle map, the pedestrian as a value for an average pedestrian volume based on the direction vector 85 of the pedestrian for the autonomous vehicle, thus changing the direction vector 84 of the pedestrian for the autonomous vehicle. In this case, the travel route of the autonomous vehicle may be changed.

FIGS. 8A and 8B illustrate static information and dynamic information used in a vector-based map, according to an embodiment of the present disclosure.

Referring to FIG. 8A, the static information may include preset fixed information for the travel route of the autonomous vehicle. For example, the fixed information may indicate information that does not change within a traveling time range. For example, the static information may include parking surface feature information (the parking spaces for the handicapped, women only, compact vehicles, electric vehicles, shared vehicles, etc.), a directive distance to a node (a direction vector), a lane thickness, a total number of nodes, the number of connected/branched paths and features thereof, one-way traffic information, limited speeds, and so forth.

Referring to FIG. 8B, the dynamic information may include changeable information that changes in real time with respect to the travel route of the autonomous vehicle. The dynamic information may be updated in predetermined units of time. For example, the dynamic information may include parking surface occupancy information (the number of remaining surfaces in a floor, an available state in a surface unit), position information (position vector) and a directive distance (direction vector) to a node on an optimal route, a behavior, pedestrian position information (position vector) and directive distance (direction vector), danger information, construction information, road narrowing information such as stop/double parking, etc.

According to the present disclosure, by reducing the amount of computation and a data size by using the vector-based map, lightweightening for overcoming a limit of a high-definition (HD) map may be possible.

Moreover, according to the present disclosure, by manufacturing a dynamic map to determine both a stationary object and a mobile object using a direction vector, the behavior of the autonomous vehicle capable of effectively responding to a fluid situation may be decided.

In addition, according to the present disclosure, safety information such as a pedestrian, etc., as well as route guidance may be provided, thereby helping operation control of the vehicle like slowing down or stopping preemptively and thus improving safety.

The apparatus and/or system described above may be implemented by a hardware component, a software component, and/or a combination of the hardware component and the software component. The apparatus and components described in the embodiments may be implemented using one or more general-purpose or special-purpose computers such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications running on the OS. The processing device may access, store, manipulate, process, and generate data in response to execution of software. For convenience of understanding, it is described that one processing device is used, but those of ordinary skill in the art would recognize that the processing device includes a plurality of processing elements and/or a plurality of types of processing elements. For example, the processing device may include a plurality of processors or one processor and one controller. Alternatively, other processing configurations such as parallel processors may be possible.

Software may include a computer program, a code, an instruction, or a combination of one or more thereof, and may configure a processing device to operate as desired or independently or collectively instruct the processing device. The software and/or data may be permanently or temporarily embodied in any type of machine, component, physical device, virtual equipment, computer storage medium or device, or signal wave to be transmitted, so as to be interpreted by or to provide instructions or data to the processing device. The software may be distributed over computer systems connected through a network and may be stored or executed in a distributed manner. The software and data may be stored in one or more computer-readable recording media.

The method according to the embodiments may be implemented in the form of program commands that can be executed through various computer components and recorded in a computer-readable recording medium. The computer-readable recording medium may include a program command, a data file, a data structure, etc., alone or in a combined manner. The program command recorded in the medium may be a program command specially designed and configured for the embodiments or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM), flash memory, etc. The present disclosure is not limited thereto, and the examples of the computer-readable recording medium may include a virtual storage and recording medium such as cloud.

Examples of the program command may include not only a machine language code created by a complier, but also a high-level language code executable by a computer using an interpreter. The foregoing hardware device may be configured to be operated as at least one software module to perform an operation of the embodiments, or vice versa.

Although the present disclosure has been described with reference to an example shown in the drawings, it will be understood by those of ordinary skill in the art that various modifications and equivalent other examples may be made from the shown example. Accordingly, the true technical scope of the present disclosure should be defined by the technical spirit of the appended claims.

The invention claimed is:

1. An apparatus for guiding an autonomous vehicle to a destination, the apparatus comprising:

a communication unit configured to form network connection with an external device;

a processor; and a memory storing instructions executable by the processor, wherein the processor is further configured to, by executing the instructions:

identify static information and dynamic information on a travel route of the autonomous vehicle;

create a vector-based map representing basic nodes and space feature points for the travel route of the autonomous vehicle in a vector coordinate system by using the static information and the dynamic information converted on a vector basis;

calculate an optimal route to the destination, based on the static information and the dynamic information;

calculate a plurality of target nodes corresponding to the optimal route among a plurality of basic nodes included in the vector-based map;

calculate a direction vector between the autonomous vehicle and a target node through a vector operation between a direction vector of the autonomous vehicle and a direction vector of the target node on the vector coordinate system; and guide the autonomous vehicle to the destination by using information about the optimal route.

2. The apparatus of claim 1, wherein the processor is further configured to, by executing the instructions:

calculate a plurality of direction vectors indicating a travel route of the autonomous vehicle for the plurality of target nodes.

3. The apparatus of claim 2, wherein the processor is further configured to, by executing the instructions:

update the plurality of direction vectors based on the static information and the dynamic information; and decide a behavior of the autonomous vehicle for each of the plurality of target nodes, by using the plurality of direction vectors.

4. The apparatus of claim 1, wherein the static information comprises preset fixed information for the travel route of the autonomous vehicle.

5. The apparatus of claim 1, wherein the dynamic information comprises changeable information that changes in real time with respect to the travel route of the autonomous vehicle, and the dynamic information is updated in predetermined units of time.

6. A non-transitory computer-readable medium storing the instructions executed by the processor according to claim 1.

7. A method of guiding an autonomous vehicle to a destination, the method comprising:

identifying static information and dynamic information on a travel route of the autonomous vehicle;

creating a vector-based map representing basic nodes and space feature points for the travel route of the autonomous vehicle in a vector coordinate system by using the static information and the dynamic information converted on a vector basis;

calculating an optimal route to the destination, based on the static information and the dynamic information;

calculating a plurality of target nodes corresponding to the optimal route among a plurality of basic nodes included in the vector-based map;

calculating a direction vector between the autonomous vehicle and a target node through a vector operation between a direction vector of the autonomous vehicle and a direction vector of the target node on the vector coordinate system; and guiding the autonomous vehicle to the destination using information about the optimal route.

8. The method of claim 7, wherein the calculating of the direction vector comprises:

calculating a plurality of direction vectors indicating a travel route of the autonomous vehicle for the plurality of target nodes.

9. The method of claim 8, wherein the guiding of the autonomous vehicle to the destination comprises:

updating the plurality of direction vectors, based on the static information and the dynamic information; and deciding a behavior of the autonomous vehicle for each of the plurality of target nodes by using the plurality of direction vectors.

10. The method of claim 7, wherein the static information comprises preset fixed information for the travel route of the autonomous vehicle.

11. The method of claim 7, wherein the dynamic information comprises changeable information that changes in real time with respect to the travel route of the autonomous vehicle, and the dynamic information is updated in predetermined units of time.

12. A non-transitory computer-readable medium storing instructions to execute the method according to claim 7.

* * * * *